(12) United States Patent
Cooper

(10) Patent No.: US 9,130,822 B2
(45) Date of Patent: *Sep. 8, 2015

(54) METHOD, SYSTEM AND COMPUTER PROGRAM PRODUCT FOR INTERCEPTION, QUARANTINE AND MODERATION OF INTERNAL COMMUNICATIONS OF UNCONTROLLED SYSTEMS

(71) Applicant: Socialware, Inc., Austin, TX (US)

(72) Inventor: Cameron Blair Cooper, Lakeway, TX (US)

(73) Assignee: Socialware, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,151

(22) Filed: Nov. 1, 2013

(65) Prior Publication Data

US 2014/0059153 A1 Feb. 27, 2014

Related U.S. Application Data

(63) Continuation of application No. 12/785,276, filed on May 21, 2010, now Pat. No. 8,601,114.

(51) Int. Cl.
| | |
|---|---|
| *G06F 15/173* | (2006.01) |
| *H04L 12/26* | (2006.01) |
| *H04L 12/58* | (2006.01) |
| *G06F 17/30* | (2006.01) |
| *H04L 29/06* | (2006.01) |

(Continued)

(52) U.S. Cl.
CPC .......... *H04L 43/00* (2013.01); *G06F 17/30867* (2013.01); *H04L 51/32* (2013.01); *H04L 63/0245* (2013.01); *H04L 63/1408* (2013.01); *H04L 67/02* (2013.01); *H04W 4/001* (2013.01)

(58) Field of Classification Search
CPC . H04L 43/00; H04L 63/0245; H04L 63/1408; H04L 51/32; H04L 67/02; G06F 17/30867; H04W 4/001
See application file for complete search history.

(56) References Cited

U.S. PATENT DOCUMENTS

| | | | |
|---|---|---|---|
| 7,586,871 | B2 | 9/2009 | Hamilton et al. |
| 8,601,114 | B1 | 12/2013 | Cooper |

(Continued)

OTHER PUBLICATIONS

Office Action issued in U.S. Appl. No. 12/785,276, mailed Jun. 6, 2012, 10 pages.

(Continued)

*Primary Examiner* — Wen-Tai Lin
(74) *Attorney, Agent, or Firm* — Sprinkle IP Law Group

(57) ABSTRACT

Embodiments disclosed herein may intercept, quarantine, and moderate communications internal to an uncontrolled system. An example of an uncontrolled system may be a web application associated with a social networking site. In accessing the social networking site, a user may type in a message. An instance of the uncontrolled system running on the user's device may prepare a request containing the message. Some embodiment disclosed herein may determine that the message is subject to moderation, intercept the request, and place the message in a queue. This determination may be based on the destination of the request as well the type of the message. Some embodiments may reconstruct the original request for resubmission. If the session is expired, some embodiments may log in for the user and resubmit the reconstructed request. Some embodiments may simply wait for the next time the user logs in to resubmit the reconstructed request.

20 Claims, 4 Drawing Sheets

(51) Int. Cl.
*G06F 15/16* (2006.01)
*G06F 17/00* (2006.01)
*H04W 4/00* (2009.01)
*H04L 29/08* (2006.01)

(56) References Cited

U.S. PATENT DOCUMENTS

2008/0178298 A1 7/2008 Arai et al.
2009/0313318 A1 12/2009 Dye et al.
2010/0106777 A1 4/2010 Cooper et al.
2011/0125697 A1 5/2011 Erhart et al.
2012/0023090 A1 1/2012 Holloway et al.

OTHER PUBLICATIONS

Office Action issued in U.S. Appl. No. 12/785,276, mailed Dec. 27, 2012, 10 pages.
Notice of Allowance issued in U.S. Appl. No. 12/785,276, mailed Jul. 31, 2013, 5 pages.
"Stateful firewall," retrieved from <<http://en.wikipedia.org/wiki/Stateful_firewall>> on Mar. 6, 2015, 5 pages.

METHOD, SYSTEM AND COMPUTER PROGRAM PRODUCT FOR INTERCEPTION, QUARANTINE AND MODERATION OF INTERNAL COMMUNICATIONS OF UNCONTROLLED SYSTEMS

CROSS-REFERENCE TO RELATED APPLICATION

This application is a continuation of, and claims a benefit of priority under 35 U.S.C. 120 of the filing date of U.S. patent application Ser. No. 12/785,276, filed May 21, 2010, now U.S. Pat. No. 8,601,114, entitled "METHOD, SYSTEM AND COMPUTER PROGRAM PRODUCT FOR INTERCEPTION, QUARANTINE AND MODERATION OF INTERNAL COMMUNICATIONS OF UNCONTROLLED SYSTEMS," which is fully incorporated by reference herein.

TECHNICAL FIELD

This disclosure relates generally to web applications and more particularly to social networking applications. Even more particularly, this disclosure relates to a system, method, and computer program product comprising instructions translatable by a computer to intercept, quarantine, and moderate communications internal to systems that are beyond the control of computing environments where embodiments disclosed herein may reside.

BACKGROUND

Advances in communications technology often change how people communicate and share information. More recently, social networking sites are providing new ways for users to interact and keep others abreast of their personal and business dealings. The growth of social networking sites is staggering. New sites are emerging daily and new users are joining in droves. Today, social networking sites are being used regularly by millions of people around the globe, and it seems that social networking via websites will continue to be a part of everyday life at least in the United States.

The main types of social networking services provided by social networking sites are those which contain directories or categories, a means to connect with friends, and a means to recommend other individuals. For example, a social networking site may allow a user to identify an individual as a friend, a former classmate, or an uncle. The social networking site may recommend to the user another individual as a potential friend and also provide a personalized web page for the user to interact with those that the user has identified as "friends" via the social networking site.

Some social networking sites provide functions in the form of web applications for members to create user profiles, send messages to other members who are their "friends," and personalize web pages available to friends and/or the general public. Through these web applications, social networking sites can connect people at low cost and very high efficiency. Some entrepreneurs and businesses looking to expand their contact base have recognized these benefits and are utilizing some social networking sites as a customer relationship management tool for selling their products and services.

For businesses and entities alike looking to embrace social networking sites as an additional method to exchange information between employees, clients, vendors, etc., the integration of social networking sites into their internal computing environments necessarily raises several critical concerns. What activities will people be allowed to be engaged in? What information may be disclosed and to what extent? Who is the information being disclosed to? Is malicious or otherwise damaging material being accessed or allowed onto the business's computers? How can a business manage the activities of particular users or groups?

Currently, there are no viable solutions to these difficult questions as businesses do not have control over web applications and associated data provided by independent entities, including social networking sites own and operated by such independent entities. Some businesses have the means to block traffic to and from social networking sites. Some businesses can only hope that their employees are only using these social networking sites in the best interest of the company. There is no guarantee that the employees may police their own access to and participation at social networking sites and there is always the concern of an employee knowingly or unknowingly posting confidential information on a social networking site. Because of these risks, many businesses simply choose to deny their employees access to uncontrolled web applications and forgo the efficiencies and cooperative gains that may come from embracing social networking sites.

SUMMARY

Traditionally, to the extent that a business or entity allows users within its computing environment access to the Internet, it has no ways of controlling, monitoring, and/or archiving communications between its users and web applications that are not provided by the business or entity. This type of web applications is referred to herein as uncontrolled web applications as they are not controlled by the business or entity that operates the computing environment from where user requests for access are generated. Uncontrolled web applications or software systems are collectively referred to herein as uncontrolled systems. Uncontrolled systems may come in various forms. One example of an uncontrolled system may be an application running on a social networking site such as Facebook.

While web scanning systems may be able to monitor network traffic and detect certain words or patterns and block a request to a social networking site, they have no method to block the request elegantly, without breaking the user experience. Moreover, conventional web scanning systems have no means of resubmitting the request if it is approved by a moderator.

Embodiments disclosed herein provide a system, method, and computer program programming comprising one or more non-transitory computer readable storage media storing computer instructions for intercepting, quarantine, and moderating internal communications of uncontrolled systems. In some embodiments, the functionality disclosed herein can be implemented as a middleware or proxy within or outside an enterprise computing environment, a private network, or the like.

In some embodiments, a method for intercepting, quarantine, and moderating internal communications of an uncontrolled system may comprise loading an instance of the uncontrolled system on a device associated with a user in a computing environment. The uncontrolled system may reside at a server computer external to and independent and separate from the computing environment. During the course of accessing the uncontrolled system, the user may type in a message as usual. An instance of the uncontrolled system running on the user's device may prepare a request containing the message. Some embodiments disclosed herein may determine that the message is subject to moderation, intercept the request, and place the message in a moderation queue. This determination may be based on the destination of the request as well the type of the message.

In some embodiments, a computer may perform the interception and put the original request in a moderation queue. In some embodiments, the moderation queue may reside within or outside of the computing environment. In some embodiments, a proxy or middleware server computer may perform all the functions disclosed herein, including interception, quarantine, moderation, resubmission, and so on.

In some embodiments, moderation may comprise automated moderation, manual moderation, or a combination thereof. Through moderation, intercepted requests may be blocked or allowed to be resubmitted. When an intercepted request is approved for resubmission, some embodiments may reconstruct the original request. If a session corresponding to the original request has since expired, some embodiments may log in for the user and resubmit the reconstructed request. Some embodiments may simply wait for the next time the user logs in to resubmit the reconstructed request. Some embodiments may comprise a plurality of application programming interfaces (APIs), each of which is specific to an uncontrolled system, and may communicate the reconstructed request with the uncontrolled system via a corresponding API.

Because embodiments disclosed herein have the ability to intercept, quarantine, and moderate communications internal to uncontrolled systems, it may not be necessary for an entity operating a private network to block its users from accessing such uncontrolled systems entirely. In this way, it is possible for entities and enterprises alike to gain benefits that may come from embracing social networking sites without risking the downsides of allowing their users access to uncontrolled web applications.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
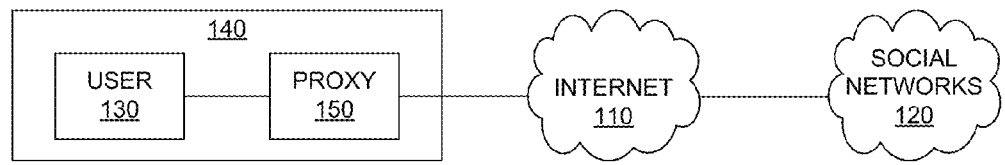
FIG. 1 depicts a simplified diagrammatic representation of a prior art architecture in which users in a private network may access social networking sites via the Internet.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on one or more computer-readable storage media. Within this disclosure, the term "computer-readable storage media" encompasses all types of data storage media that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Those skilled in the arts will recognize that the disclosed embodiments have relevance to a wide variety of areas in addition to the specific examples described below. For example, although the examples below are described in the context of employers and employees, some embodiments disclosed herein can be adapted or otherwise implemented to work in other types of relationships, circumstances, and places such as public libraries, parent-child, school-student, or any other place or relationship where it is desirable to monitor and protect network traffic to and from social networking sites.

FIG. 1 depicts a simplified diagrammatic example of how traditionally an entity or organization may monitor and protect network traffic to and from social networking sites. In this example, Company A may own and operate company network 140. Examples of company network 140 may include a local area network (LAN), an intranet—a private computer network within the organization, etc. User 130 of company network 140 may access Internet 110 via proxy 150. Social networking sites 120 may be generally accessible by users connected to Internet 110. As an example, social networks 120 may include, but are not limited to, Facebook®, LinkedIn®, Twitter®, MySpace®, Friendster®, Multiply®, Orkut®, Cyworld®, Hi5®, and others. All trademarks, service marks, and logos used herein are properties of their respective companies.

In some cases, proxy 150 of company network 140 may monitor and block all network traffic to and from one or more social networking sites 120 by way of a firewall implemented on proxy 150. As known to those skilled in the art, a firewall may be implemented as a part of a computer system or network that is designed to block unauthorized access while permitting authorized communications. A firewall may be implemented as a device or a set of devices configured to permit, deny, encrypt, decrypt, or proxy all incoming and outgoing network traffic between different domains based upon a set of rules and other criteria. Firewalls may be implemented in hardware, software, or a combination of both. Firewalls are frequently used to prevent unauthorized Internet users from accessing private networks connected to the Internet, especially intranets. Generally, all messages entering or leaving the intranet pass through the firewall, which examines each message and blocks those that do not meet the specified security criteria.

Proxy 150 represents a server computer that acts as an intermediary for requests from user 130 seeking resources from other servers, including those that reside outside of network 140. Those skilled in the art can appreciate that user 130 is a representation of a typical user in company network 140 and may include software and hardware utilized by the user to access company network 140 and Internet 110.

Figure 2:
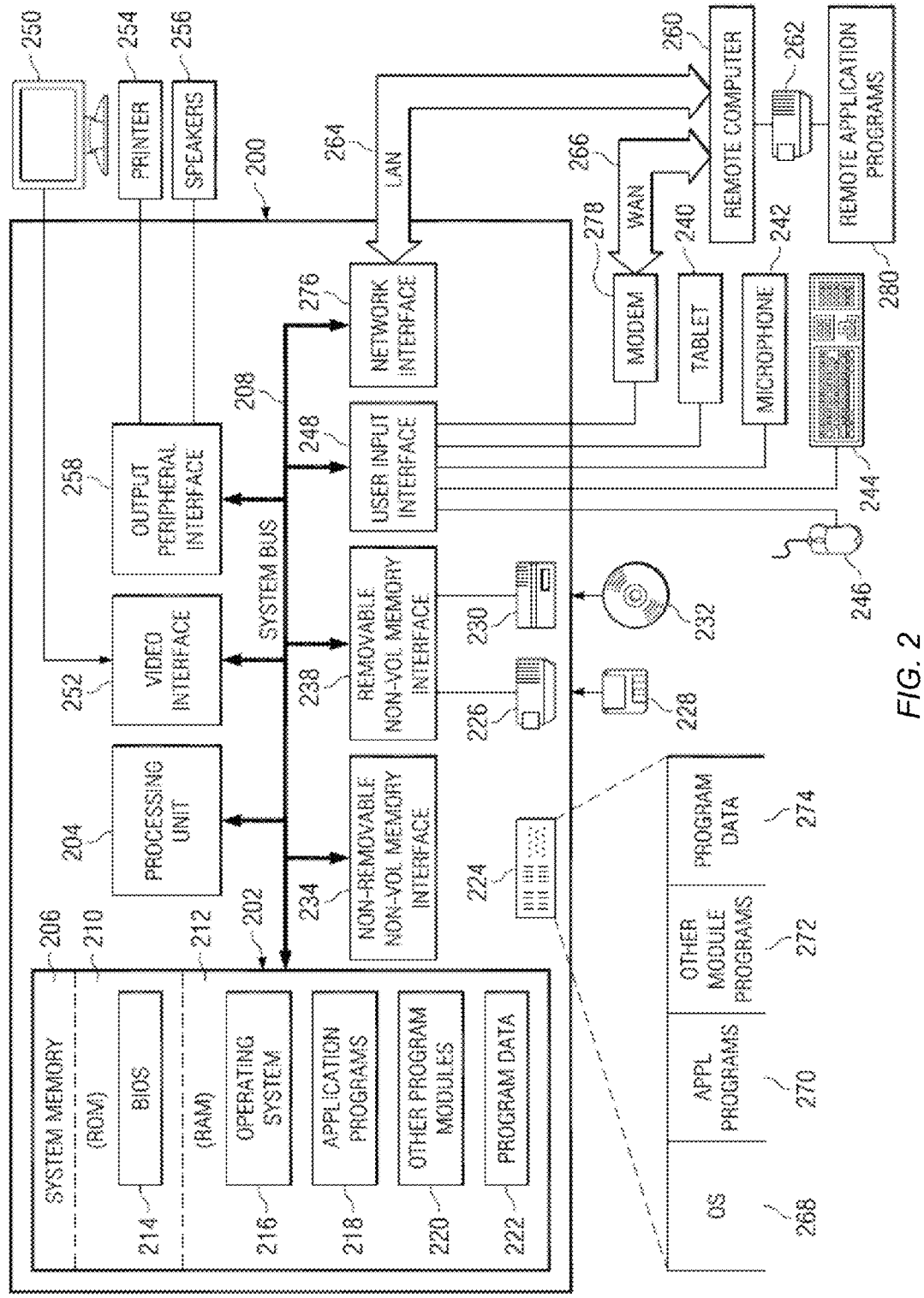
FIG. 2 depicts a diagrammatic representation of an exemplary computer system comprising at least one computer readable storage medium storing computer instructions implementing an embodiment disclosed herein.

FIG. 2 depicts an exemplary system within a computing environment where embodiments disclosed herein may be implemented. Components 202 of computing system 200 may include, but are not limited to, processing unit 204, system memory 206, and system bus 208. System bus 208 may couple various system components including system memory 206 to processing unit 204. System bus 208 may comprise any of several types of bus structures including a memory bus or memory controller, a peripheral bus, and a local bus using any of a variety of bus architectures.

Computing system 200 may include a variety of computer readable storage media. Computer readable storage media can be any available storage media that can be accessed by computing system 200. By way of example, and not of limitation, computer readable storage media may comprise volatile and nonvolatile storage media and removable and non-removable storage media. Computer readable storage media storing computer instructions implementing embodiments disclosed herein may be manufactured by known methods and materials and may rely on known programming languages and techniques for storage of information thereon. Examples of computer readable storage media may include, but are not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 200.

In the example shown in FIG. 2, system memory 206 includes ROM 210 and RAM 212. ROM 210 may store basic input/output system 214 (BIOS), containing the basic routines that help to transfer information between elements within computing system 200, such as those used during start-up. RAM 212 may store data and/or program modules that are immediately accessible to and/or presently being operated on by processing unit 204. By way of example, and not of limitation, FIG. 2 shows RAM 212 storing operating system 216, application programs 218, other program modules 220, and program data 222.

Computing system 200 may also include other removable/non-removable, volatile/nonvolatile computer readable storage media that can be employed to store computer instructions implementing some embodiments disclosed herein. By way of example only, computing system 200 may include hard disk drive 224, a magnetic disk drive 226, and/or optical disk drive 230. Hard drive (HD) 224 may read from and write to non-removable, nonvolatile magnetic media. Disk drive 226 may read from and write to removable, nonvolatile magnetic disk 228. Optical disk drive 230 may read from and write to a removable, nonvolatile optical disk 232 such as a CD ROM or other optical medium. Other removable/non-removable, volatile/nonvolatile computer readable storage media are also possible. As illustrated in FIG. 2, hard drive 224 may be connected to system bus 208 via a non-removable memory interface, such as interface 234, and magnetic disk drive 226 and optical disk drive 230 may be connected to system bus 208 via a removable memory interface, such as interface 238.

The drives and their associated computer readable storage media, discussed above, may provide storage of computer readable instructions, data structures, program modules and other data for computing system 200. For example, hard disk drive 224 may store operating system 268, application programs 270, other program modules 272 and program data 274. Note that these components can either be the same as or different from operating system 216, application programs 218, other program modules 220, and program data 222.

A user may enter commands and information into computing system 200 via input devices such as tablet or electronic digitizer 240, microphone 242, keyboard 244, and pointing device 246. Pointing device 246 may comprise a mouse, a trackball, and/or a touch pad. These and other input devices may be connected to processing unit 204 via user input interface 248. User input interface 248 may be coupled to system bus 208 or via other interface and bus structures, such as a parallel port, a game port, or a universal serial bus (USB).

Monitor or other type of display device 250 may be connected to system bus 208 via an interface, such as a video interface 252. Monitor 250 may also be integrated with a touch-screen panel or the like. Note that the monitor and/or touch screen panel can be physically coupled to a housing in which computing system 200 is incorporated, such as in a tablet-type personal computer. Computing system 200 may comprise additional peripheral output devices such as speakers 256 and printer 254, which may be connected via an output peripheral interface 258 or the like.

Computing system 200 may operate in a networked environment and may have logical connections to one or more remote computers, such as remote computing system 260. Remote computing system 260 may be a personal computer, a server, a router, a network PC, a peer device or other common network node. Although only a memory storage device 262 is shown in FIG. 2, remote computing system 260 may include many or all of the components and features described above with reference to computing system 200.

Logical connections between computing system 200 and remote computing system 260 may include local area network (LAN) 264, connecting through network interface 276, and wide area network (WAN) 266, connecting via modem 278. Additional networks may also be included.

Embodiments disclosed herein can be implemented to run on various platforms operating under system software such as IBM OS/2®, Linux®, UNIX®, Microsoft Windows®, Apple Mac OSX® and others in development or commercially available. The functionality disclosed herein may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside on one or more computer readable storage media described above. In FIG. 2, an exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are known to those skilled in the art.

In an illustrative embodiment, computer instructions implementing some embodiments disclosed herein may comprise lines of compiled C++, Java, or other language code. Other architectures may be used. In the hardware configuration above, various software components may reside on any single computer or on any combination of separate computers. In some embodiments, some or all of the software components may reside on the same computer. In some embodiments, the functions of any of the systems and methods may be performed by a single computer. In some embodiments, different computers than are shown in FIG. 2 may perform those functions. Additionally, a computer program or its software components with such code may be embodied in more than one computer readable medium in more than one computer.

Figure 3:
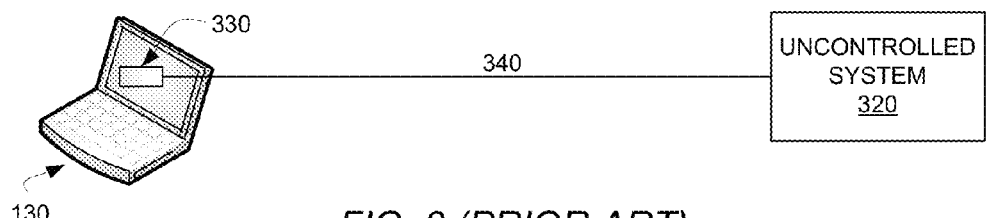
FIG. 3 depicts a simplified diagrammatic representation of a prior art architecture in which a piece of code from an uncontrolled application or software system such as one that is associated with a social networking site may run on a user and conduct internal communications with the uncontrolled system.

FIG. 3 depicts a simplified diagrammatic representation of a prior art architecture in which a piece of code such as JavaScript 330 from uncontrolled system 320 may run on a device associated with user 130 and conduct internal communications 340 with uncontrolled system 320. Communications 340 are considered internal to uncontrolled system 320 because code 330, acting as the user agent for uncontrolled system 320, is typically not controllable by administrator(s) of the computing environment from where user 130 accesses uncontrolled system 320.

More specifically, as described below in more detail, code 330 of uncontrolled system 320 is responsible for communications 340. This is in contrast to the generic network traffic described above with reference to FIG. 1 where a browser application running on a device associated with user 130 usually acts as the user agent and is generally responsible for preparing a request and submitting the request to a network site external to computing environment 140.

Figure 4:
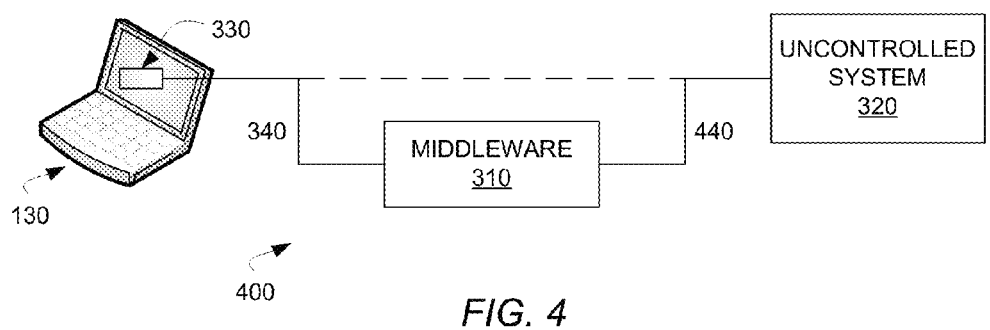
FIG. 4 depicts a simplified diagrammatic representation of a system architecture in which the internal communication of an uncontrolled system is intercepted by an embodiment disclosed herein.

FIG. 4 depicts a simplified diagrammatic representation of system architecture 400 in which internal communications 340 between code 330 and uncontrolled system 320 may be intercepted by middleware 310. In some embodiments, internal communications 340 may comprise an application layer protocol request. In some embodiments, such a request may be a Hypertext Transfer Protocol (http) request. As a specific example, middleware 310 may intercept internal communications 340 and put it through a moderation flow. In some embodiments, such a moderation flow may be fully or semi-automated. The moderation may block communications 340 or may allow communications 340 to be resubmitted to uncontrolled system 320 via reconstructed request 440.

Figure 5:
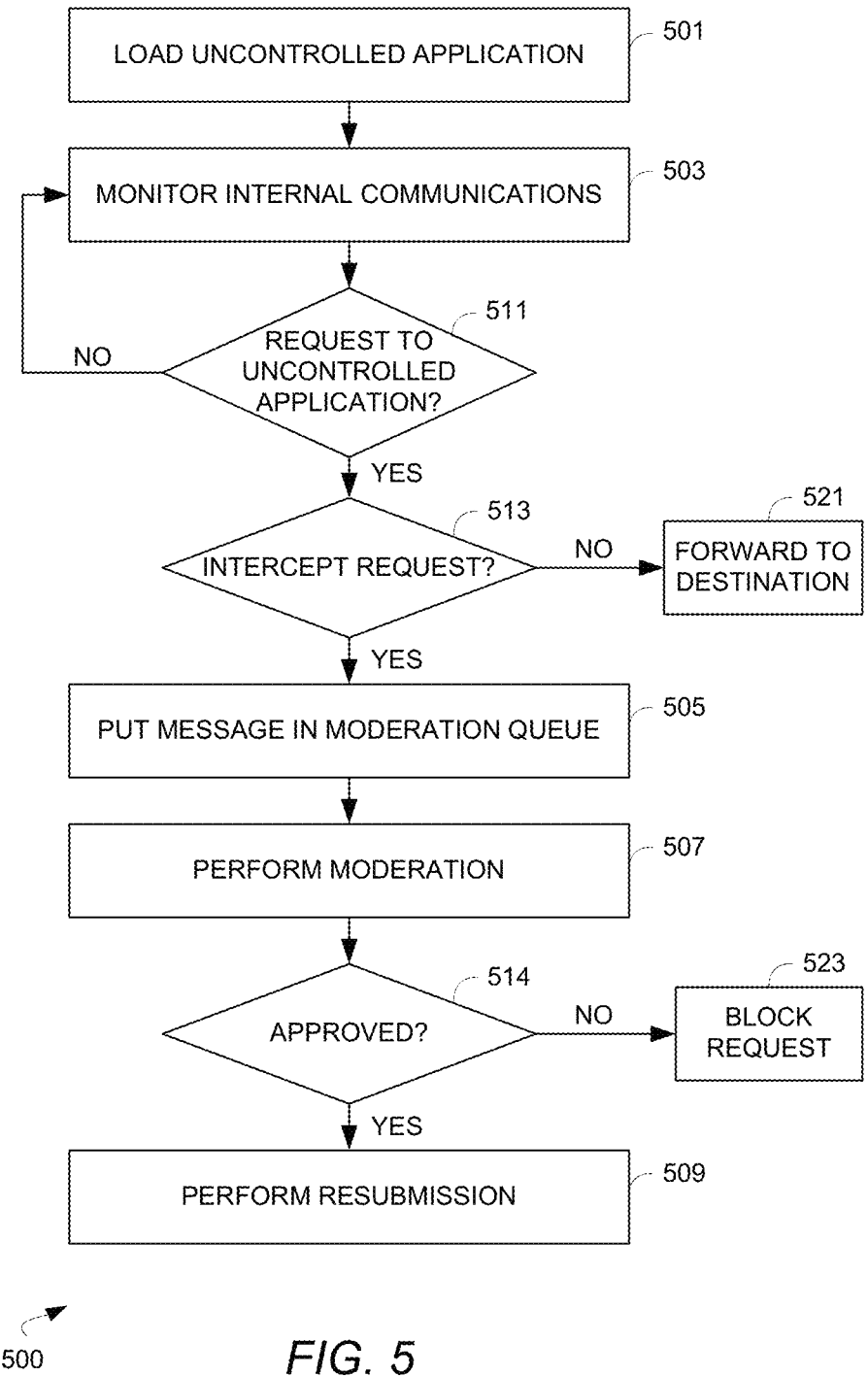
FIG. 5 depicts a flow diagram illustrating an example of one embodiment of a method for intercepting, quarantine, and moderating internal communications of an uncontrolled system.

FIG. 5 depicts a flow diagram illustrating an example of one embodiment of a method for intercepting, quarantine, and moderating internal communications of an uncontrolled system. In some embodiments, method 500 may comprise loading a piece of code or an instance of an uncontrolled application on a device associated with a user in a computing environment (step 501) and monitoring traffic between the code running on the user device and the uncontrolled application running on an external site such as a social networking site (step 503). As an example, the social networking site may be operated by Twitter and the code may comprise Twitter JavaScript.

Figure 6:
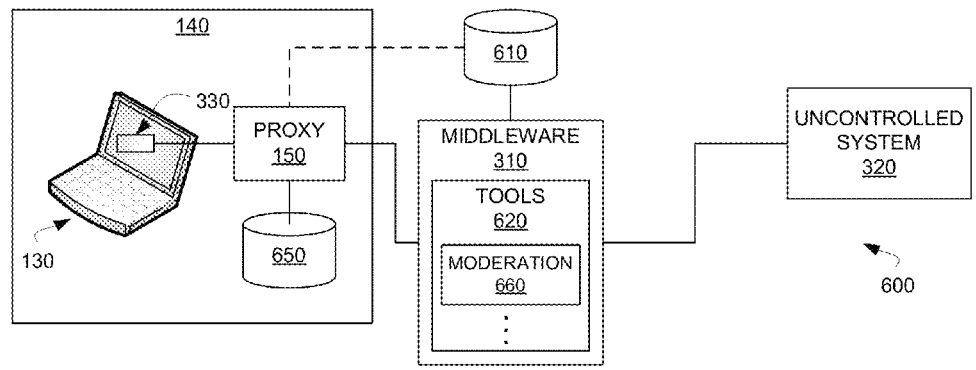
FIG. 6 depicts a diagrammatic representation of a system architecture in which the internal communication of an uncontrolled system is intercepted by an embodiment disclosed herein.

Referring also to FIG. 6, when user 130 types in a message, code 330 may formulate a request containing the message. Following the above example, when user 130 types in a tweet, the Twitter JavaScript may formulate an http request containing the tweet for posting to the user's twitter account maintained by Twitter. Proxy server 150 residing in computing environment 140 or middleware 310 of system 600 may determine whether the request from user 130 is destined for uncontrolled system 320 (step 511). If the request from user 130 is not destined for uncontrolled system 320, the request is processed normally and flow 500 returns to step 503 to continue to monitor internal communications 340. If the request from user 130 is destined for uncontrolled system 320, proxy server 150 or middleware 310 may determine whether the request is subject to interception (step 513) based on the destination of the request as well as the type of message in the request. If the request from user 130 is not subject to interception, proxy server 150 or middleware 310 may forward the request to its destination (step 521). If the request from user 130 is subject to interception, proxy server 150 or middleware 310 may put the request through a moderation flow (step 505).

In some embodiments, this involves placing a job corresponding to the request in a moderation queue. In some embodiments, moderation queue 650 may reside within computing environment 140. In some embodiments, moderation queue 610 may reside outside of computing environment 140.

Those skilled in the art will appreciate that it may not be necessary to perform all the steps of method 500 and that some steps may be skipped. Further, in some embodiments, additional steps may be included in method 500. Other modifications and variations may be possible without departing from the scopes and the spirits of this disclosure.

In some embodiments, method 500 may further comprise performing moderation on one or more jobs in the moderation queue (step 507). In some embodiments, middleware 310 may comprise a plurality of software tools 620, including moderation 660. In some embodiments, moderation 660 may be automated or semi-automated. In some embodiments, method 500 may further comprise determining whether to block a request or allow it to be resubmitted to uncontrolled system 320 (step 514). In some embodiments, if the request is not approved via moderation 660, the request is blocked (step 523). In some embodiments, if the request is approved, method 500 may further comprise performing resubmission of the approved request (step 509). In some embodiments, this may involve reconstructing the original, intercepted request.

If a session corresponding to the original request has since expired, some embodiments may log in for the user and resubmit the reconstructed request. Some embodiments may simply wait for the next time the user logs in to resubmit the reconstructed request. Some embodiments may comprise a plurality of application programming interfaces (APIs), each of which is specific to an uncontrolled system, and may communicate the reconstructed request with the uncontrolled system via a corresponding API.

FIG. 6 depicts a diagrammatic representation of a system architecture in which the internal communication of an uncontrolled system is intercepted by an embodiment disclosed herein. FIG. 6 illustrates how an entity or organization implementing an embodiment disclosed herein may monitor and protect network traffic to and from social networking sites. In this example, Company B may own and operate an example uncontrolled system referred to hereinafter as social networking site 320 independent of Company A which owns and operates enterprise computing environment 140, also referred to herein as company network 140, private network 140, internal network 140 or simply network 140. Company A may represent an entity. Examples of such an entity may include, but are not limited to, an enterprise, a business, a company, a school, a hospital, a library, a government agency, an office, a home, and so on. End user 130 may represent any individual in a public or private office, government, home, or school setting and may include software and hardware necessary for accessing network 140 and Internet 110. End user 130 may utilize a computing device to bi-directionally connect to Internet 110 where social networking site 320 resides. Communications media that may facilitate such bi-directional connections may include an intranet, a virtual private network ("VPN"), and/or a wireless network, etc.

Company B may comprise hardware, software, infrastructure, and people necessary to operate and maintain social networking site 320. Social networking site 320 may be implemented in a manner known to those skilled in the art. As a specific example, a user may log in to social networking site 320 via a browser application or via a mobile application running on the user's wired or wireless computing device. Examples of a wireless computing device may include, but are not limited to, a laptop computer, a personal digital assistant (PDA), a mobile phone, an Internet enabled mobile device, and so on.

In the example of FIG. 6, proxy 150 resides within network 140 and is bi-directionally coupled to end user 130 via a wired or wireless internal network connection. Proxy 150 may be communicatively coupled to social network 320 over Internet 110. In some embodiments, proxy 150 may function as a gateway or intermediary between end user 130 and social networking site 320. More specifically, proxy 150 may be responsible for receiving all incoming requests from and sending corresponding responses to end user 130. As illustrated in FIG. 5, in some embodiments of flow 500, proxy 150 may operate to receive a user request from user 130 (step 503), determine whether that request contains a destination pertaining to social networking site 320 (step 511), and either pass the request from user 130 that is destined to social networking site 320 to middleware 310 for processing (step 513) or pass the request to the destination (step 521) if it is not destined to social networking site 320.

As described above, in some embodiments, as users in network 140 post messages to social networking site 320 or any of the sites designated as subject to interception, middleware 310 may operate to stop these messages and send them through a moderation process (step 507). If a message is to be blocked (step 523), middleware 310 may simulate a response to the user device from where the message is originated. The simulated response may resemble a response from social networking site 320, with an indication that the user's message has been blocked. An example of such a response may be a web page that is structured and assembled by middleware 310 on-the-fly, with at least one feature-level modification to inform the user that the message has been blocked. In some embodiments, other than certain feature(s) being disabled or unavailable to user 130, the simulated response generated by middleware 310 may be substantially similar to a corresponding response generated by social networking site 320. Readers are directed to co-pending U.S. patent application Ser. No. 12/785,294, filed May 21, 2010, entitled "METHOD, SYSTEM AND COMPUTER PROGRAM PRODUCT FOR STRUCTURING UNSTRUCTURED DATA ORIGINATING FROM UNCONTROLLED WEB APPLICATION," for examples of structuring unstructured data originating from an uncontrolled web application and co-pending U.S. patent application Ser. No. 12/785,278, filed May 21, 2010, entitled "METHOD, SYSTEM AND COMPUTER PROGRAM PRODUCT FOR ENFORCING ACCESS CONTROLS TO FEATURES AND SUBFEATURES ON UNCONTROLLED WEB APPLICATION," for examples of feature-level modifications to data originating from an uncontrolled web application. Within this disclosure, features/subfeatures of an uncontrolled application refer to software components/subcomponents of the uncontrolled application. In some embodiments, a feature or subfeature of an uncontrolled application may be a function that allows a user to take a certain action via the uncontrolled application. Non-limiting examples of features may include status update, wall post, messaging, chat, photo upload, commenting, and so on. Non-limiting examples of subfeatures may include functions involved when using a feature. For example, a "like" button associated with the status update feature may be considered as a subfeature. Moreover, certain features/subfeatures may be common to two or more social networking sites. Status update may be one example feature that is common to many social networking sites.

Figure 7:
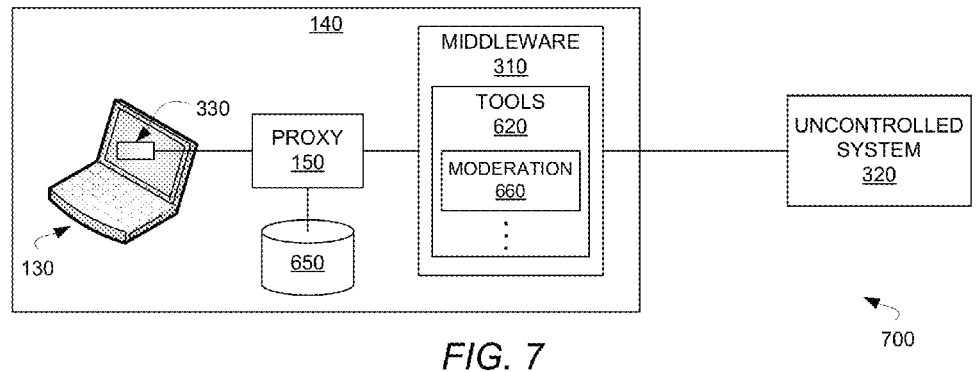
FIG. 7 depicts a diagrammatic representation of another system architecture in which the internal communication of an uncontrolled system is intercepted by an embodiment disclosed herein.

In the example of FIG. 6, middleware 310 resides and operates outside of network 140. In some embodiments, middleware 310 may reside within network 140. FIG. 7 depicts a diagrammatic representation of another system architecture in which the internal communication of an uncontrolled system is intercepted by an embodiment of middleware 310 disclosed herein. In some embodiments of system 700, middleware 310 may be implemented as part of proxy 150. In some embodiments of system 700, middleware 310 may be implemented as a service to proxy 150.

Unlike conventional network traffic interception, the interception disclosed here is source/destination specific as well as content type specific. In some embodiments, middleware 310 may have prior knowledge of what uncontrolled systems may be accessed by users in network 140. For example, middleware 310 may have access to a list of universal resource locator (URL) addresses that are associated with uncontrolled systems and that are subject to interception, quarantine, and/or moderation. An example of such an URL may be: <http://www.twitter.com/status/update>. In some embodiments, middleware 310 may have prior knowledge of what type of content in a user request referencing one of the designated URL would be subject to interception. For example, middleware 310 may inspect or parse the request and determine that the request is of the status update type and, as such, is subject to interception.

In some embodiments, an automated moderation process may comprise determining a type of the request and processing a payload of the request accordingly. For example, if it is determined that the request is of the status update type, the automated moderation process may determine that the payload of the request should be blocked. An example of such a payload may be "status='hello world'".

As another example, middleware 310 may inspect or parse the request and determine that the request is subject to quarantine and operate to isolate the request without putting the request through any moderation process.

In some embodiments, middleware 310 may inspect or parse the request and determine how the request should be automatically moderated based on a variety of factors, including, but are not limited to, company policies, business rules, feature types, keywords, patterns, user privilege, user role, etc.

An example of a pattern of interest may be a 16-digit number representing a credit card number that the user has provided in the request to the uncontrolled system. In one embodiment, middleware 310 may operate to intercept such a request and block the user's submission of the credit card number. Another example of a pattern of interest may be a social security number.

In some embodiments, the feature types that would be useful in automated moderation may include, but are not limited to, the following:
broadcasts;
actions;
profile; and
directed messages.

Within each feature type, there may be subtypes (subfeatures). For example, the subtypes of broadcasts may include wall posts, tweets, status updates, etc. The subtypes of actions may include adding a friend, making a recommendation, searching a friend, a word, a page, an event, and so on. The subtypes of profile may include name, location, hobbies, links, etc. The subtypes of directed messages may include private messages, group mail, web based mail, etc. Each source or social networking site would have a distinct set of features or application components (including subfeatures or subcomponents), one or more of which may be of interest to Company A for the purpose of controlling accesses thereto by users of network 140. In some embodiments, the definitions or specifications of source-specific features and subfeatures may be maintained in a centralized location such as a library or a database that is accessible by middleware 310.

In some embodiments, a semi-automated moderation process may comprise conducting an automatic coarse analysis of an intercepted request and forwarding the request for a more detailed manual review or evaluation. In some embodiments, middleware 310 may implement a completely automated process (i.e., intercept and moderate every request designating an uncontrolled system), a mostly manual moderation process, and something in between. For example, in some embodiments, middleware 310 may randomly intercept 20% of the requests in network 140 designating uncontrolled systems 320.

In some embodiments, middleware 310 may comprise filters. Within this disclosure, a filter comprises a piece of code that is designed to recognize a particular portion of an application-level dynamic protocol. Hypertext Transfer protocol (http) is an example of an application-level protocol. Unlike defined or otherwise standardized protocols such as those used in e-mail communications and instant messaging, dynamic protocols used by social networking sites may change over time, be undefined, and/or vary from site to site. Dynamic protocols are known to those skilled in the art and techniques for parsing network traffic in such protocols are also known to those skilled in the art.

In some embodiments, middleware 310 may comprise various filters for parsing and access control. Below is an example of a filter for parsing an example HTML message from a social networking site known as Facebook.

Filter 1—Parse HTML Message

```
void parse(String payload) {
    HTMLDoc doc=HTMLDoc.parse(payload);
    HTMLElement element=doc.findByClass("message");
    String message=element.text( );
    return message;
}
```

Middleware 310 may further comprise various filters for content control and for understanding how, when, and what application external to network 140 is changing, and/or what type of change is involved. It could be a functional change, a layout change, a message format change, etc. For example, some embodiments may implement one or more of the following non-limiting types of filters:

1) Access control filters. These filters manipulate the code of a web application to enable and disable access to certain features depending on who the accessing user is.
2) Data archiving filters. These filters record information as it is transmitted across the wire. This may be information that is posted to social networks, or retrieved from social networks.
3) Data security filters. These filters monitor information as it is published to social networks. If data is deemed private or sensitive (by a Data Leakage Protection system or otherwise), the user will be sent a notification that they are not allowed to post that information.
4) Secure messaging filters. These filters trap information before it is able to post to a social network and store it internally. The message is replaced or otherwise substituted with a placeholder that is sent to the social network. If a user is sent the message with the placeholder, middleware 310 will remove the placeholder and display the original message. In some embodiments, middleware 310 is implemented in an appliance.

5) Notification Filters. These filters notify the user of certain information. For example, a company watermark may be placed onto a social network, informing a user of the company usage policy.

Below are non-limiting examples of various types of filters written for the example social networking site Facebook.

```
1) Access control filter, to disable Facebook chat:
        void process(String page, User user) {
            HTMLDoc doc = HTMLDoc.parse( page );
            if (user.canAccessFacebookChat( ) == false) {
                doc.findById( "chat" ).delete( );
            }
        }
2) Data archiving filter, to record Facebook chat:
        void process(String page, User user) {
            HTTPPost post = HTTPPost.parse( page );
            String fromUsername = post.getParam( "fromUser" );
            String toUsername = post.getParam( "toUser" );
            String message = post.getParam( "message" );
            DataStore.record( fromUser, toUser, message );
        }
3) Data security filter, to block credit card numbers from
    posting to Facebook walls:
        void process(String page, User user) {
            HTTPPost post = HTTPPost.parse( page );
            String wallPost = post.getParam( "wall_post" );
            if ( ContainsCreditCardNumber( wallPost ) == true ) {
                ReturnErrorToUser( );
            } else {
                AllowMessageToPost( );
            }
        }
4) Secure messaging filter, to replace Facebook wall post
    messages with a placeholder:
        // When posting a facebook wall post
        void process( String page, User user ) {
            HTTPPost post = HTTPPost.parse( page );
            String message = post.getParam( "wall_post" );
            String placeholder = GetPlaceholder( message );
            post.setParam( "wall_post" );
            // update the page with the new placeholder instead of message
            page = post.toString( );
        }
        // When viewing a wall message
        void process( String page, User user ) {
            String placeholder = GetPlaceholder( page );
            String message = GetMessage( placeholder );
            // replace the placeholder with the original message
            page.replace( placeholder, message);
        }
5) Notification Filters, add a watermark to Facebook
        void process( String page, User user ) {
            HTMLDoc doc = HTMLDoc.parse( page );
            // Insert new HTML code for the watermark
            doc.addElement ( GenerateFacebookWatermark( ) );
            page = doc.toString( );
        }
```

One skilled in the art will appreciate that other types of filters are also possible and that these filters would be source-specific and may vary from implementation to implementation.

Note that middleware filters disclosed herein are distinct from filters used by conventional web scanning systems. While web scanning systems may be able to monitor network traffic and detect certain words or patterns and block a request to a social networking site, they have no method to block the request elegantly, without breaking the user experience. One reason is that when a web filter blocks an http request, it generally does not send a response back to the application that made the request. Consequently, the application either continues to run indefinitely or simply times out, thereby breaking the user experience. This kind of web filters is generally applied to all the network traffic under monitoring, without regard to the destination. Moreover, conventional web scanning systems have no means of resubmitting the request if it is approved by a moderator.

Figure 8:
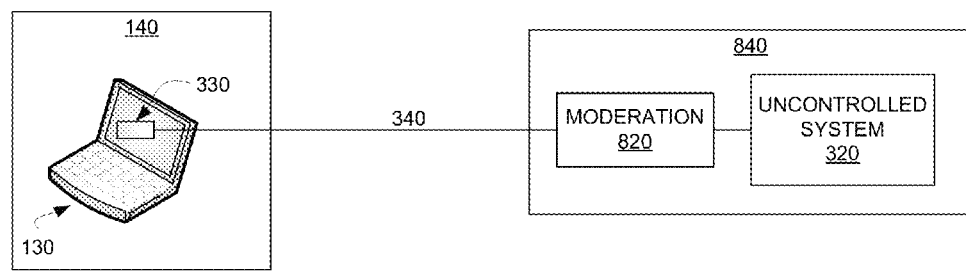
FIG. 8 depicts a diagrammatic representation of a prior art architecture in which the internal communication of an uncontrolled system is not intercepted but is moderated internally.

On the other hand, some network sites may utilize internal filters to monitor incoming traffic and perform some kind of moderation before forwarding an incoming request to its internal destination. FIG. 8 depicts a diagrammatic representation of a prior art architecture in which internal communication 340 of uncontrolled system 320 in network 840 is not intercepted but is moderated via internal moderator 820. As FIG. 8 illustrates, this approach does not provide network 140 with the ability to moderate internal communications 340 and network 140 remains unable to control the content, including possibly confidential information, submitted by user 130 to uncontrolled system 320.

Although shown and described throughout this disclosure with specific reference to an enterprise, this disclosure is intended to encompass other networking and business environments including, but not limited to: small businesses, individual users, homes, public networks, etc. It should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. For example, in addition to the above described embodiments, those skilled in the art will appreciate that this disclosure has application in a wide array of arts in addition to social networking and this disclosure is intended to include the same. Accordingly, the scope of the present disclosure should be determined by the following claims and their legal equivalents.

What is claimed is:

1. A method for monitoring network traffic, comprising:
   intercepting, by a computer having a processor and a memory, an internal communication between a first application running on a user device and a second application running on a server machine, the computer having no control over the first application and the second application, the first application comprising a piece of code from the server machine, the piece of code acting as an agent for the second application running on the server machine and is configured for the internal communication with the second application, the internal communication comprising a network message generated by the first application or the second application;
   examining a source, a destination, and content referenced in the network message, the examining including parsing the network message using one or more filters specific to the source to determine one or more content types contained in the network message;
   determining whether the source, the destination or the content referenced in the network message is subject to interception, quarantine, or moderation, the interception, quarantine or moderation being source-specific, destination-specific or content-specific;
   determining, by the computer based at least on the one or more content types, whether the network message is to be blocked from reaching the destination, approved for reaching the destination, or quarantined;
   the computer generating a simulated message for the destination if the network message is to be blocked from reaching the destination;
   the computer reconstructing the network message if the network message is to be approved for reaching the destination; and the computer isolating the network message without putting the network message through any moderation process if the network message is to be quarantined.

2. The method according to claim 1, wherein the second application is associated with a social networking site on the Internet.

3. The method according to claim 2, wherein the computer determines whether the network message is to be blocked from reaching the destination, approved for reaching the destination, or quarantined based on a plurality of factors, including a feature type of the social networking site existent in the network message.

4. The method according to claim 2, wherein the network message comprises application data from the social networking site for the first application to display a personalized web page on the user device, and wherein if a feature type of the personalized web page is to be blocked, the method further comprising, by the computer:
   disabling at least one feature of the feature type in the application data from the social networking site;
   assembling a web page resembling the personalized web page from the social networking site and with the at least one feature of the feature type disabled; and
   forwarding the web page for display on the user device.

5. The method according to claim 1, wherein the computer determines whether the network message is to be blocked from reaching the destination, approved for reaching the destination, or quarantined based on a plurality of factors, including a pattern of numbers.

6. The method according to claim 1, further comprising placing the network message in a moderation flow if the network message is subject to moderation.

7. The method according to claim 6, wherein the moderation flow is fully automated or semi-automated.

8. A computer program product comprising at least one non-transitory computer readable medium storing instructions translatable by a computer to perform:
   intercepting an internal communication between a first application running on a user device and a second application running on a server machine, the computer having no control over the first application and the second application, the first application comprising a piece of code from the server machine, the piece of code acting as an agent for the second application running on the server machine and that is configured for the internal communication with the second application, wherein the network message is generated by the first application or the second application;
   examining a source, a destination, and content referenced in the network message, the examining including parsing the network message using one or more filters specific to the source to determine one or more content types contained in the network message;
   determining whether the source, the destination or the content referenced in the network message is subject to interception, quarantine, or moderation, the interception, quarantine or moderation being source-specific, destination-specific or content-specific;
   determining based at least on the one or more content types whether the network message is to be blocked from reaching the destination, approved for reaching the destination, or quarantined;
   generating a simulated message for the destination if the network message is to be blocked from reaching the destination;
   reconstructing the network message if the network message is to be approved for reaching the destination; and
   isolating the network message without putting the network message through any moderation process if the network message is to be quarantined.

9. The computer program product of claim 8, wherein the second application is associated with a social networking site on the Internet.

10. The computer program product of claim 9, wherein the instructions are translatable by the computer to determine whether the network message is to be blocked from reaching the destination, approved for reaching the destination, or quarantined based on a plurality of factors, including a feature type of the social networking site existent in the network message.

11. The computer program product of claim 9, wherein the network message comprises application data from the social networking site for the first application to display a personalized web page on the user device, and wherein if a feature type of the personalized web page is to be blocked, the instructions are translatable by the computer to perform:
   disabling at least one feature of the feature type in the application data from the social networking site;
   assembling a web page resembling the personalized web page from the social networking site and with the at least one feature of the feature type disabled; and
   forwarding the web page for display on the user device.

12. The computer program product of claim 8, wherein the instructions are translatable by the computer to determine whether the network message is to be blocked from reaching the destination, approved for reaching the destination, or quarantined based on a plurality of factors, including a pattern of numbers.

13. The computer program product of claim 8, wherein the instructions are translatable by the computer to perform:
   placing the network message in a moderation flow if the network message is subject to moderation.

14. The computer program product of claim 13, wherein the moderation flow is fully automated or semi-automated.

15. A system for monitoring network traffic, comprising:
   at least one processor; and
   at least one non-transitory computer readable medium storing instructions translatable by the at least one processor to perform:
      intercepting an internal communication between a first application running on a user device and a second application running on a server machine, the system having no control over the first application and the second application, the first application comprising a piece of code from the server machine, the piece of code acting as an agent for the second application running on the server machine and is configured for the internal communication with the second application, wherein the network message is generated by the first application or the second application;
      examining a source, a destination, and content referenced in the network message, the examining including parsing the network message using one or more filters specific to the source to determine one or more content types contained in the network message;
      determining whether the source, the destination or the content referenced in the network message is subject to interception, quarantine, or moderation, the interception, quarantine or moderation being source-specific, destination-specific or content-specific;
      determining based at least on the one or more content types whether the network message is to be blocked from reaching the destination, approved for reaching the destination, or quarantined;

generating a simulated message for the destination if the network message is to be blocked from reaching the destination;

reconstructing the network message if the network message is to be approved for reaching the destination; and isolating the network message without putting the network message through any moderation process if the network message is to be quarantined.

16. The system of claim 15, wherein the second application is associated with a social networking site on the Internet.

17. The system of claim 16, wherein the instructions are translatable by the at least one processor to determine whether the network message is to be blocked from reaching the destination, approved for reaching the destination, or quarantined based on a plurality of factors, including a feature type of the social networking site existent in the network message.

18. The system of claim 16, wherein the network message comprises application data from the social networking site for the first application to display a personalized web page on the user device, and wherein if a feature type of the personalized web page is to be blocked, the instructions are translatable by the at least one processor to perform:

disabling at least one feature of the feature type in the application data from the social networking site;

assembling a web page resembling the personalized web page from the social networking site and with the at least one feature of the feature type disabled; and forwarding the web page for display on the user device.

19. The system of claim 15, wherein the instructions are translatable by the at least one processor to determine whether the network message is to be blocked from reaching the destination, approved for reaching the destination, or quarantined based on a plurality of factors, including a pattern of numbers.

20. The system of claim 15, wherein the instructions are translatable by the at least one processor to perform:

placing the network message in a moderation flow if the network message is subject to moderation, wherein the moderation flow is fully automated or semi-automated.

* * * * *